No. 837,848. PATENTED DEC. 4, 1906.
E. KLIMM.
FURNACE ARRANGEMENT OF STEAM ENGINES.
APPLICATION FILED JAN. 27, 1906.

2 SHEETS—SHEET 1.

Witnesses
Wm. J. Whalley.
Grace P. Brereton.

Inventor
Eugen Klimm
By Sturtevant & Staley
attys.

No. 837,848. PATENTED DEC. 4, 1906.
E. KLIMM.
FURNACE ARRANGEMENT OF STEAM ENGINES.
APPLICATION FILED JAN. 27, 1906.

2 SHEETS—SHEET 2.

UNITED STATES PATENT OFFICE.

EUGEN KLIMM, OF STUTTGART, GERMANY.

FURNACE ARRANGEMENT OF STEAM-ENGINES.

No. 837,848.      Specification of Letters Patent.      Patented Dec. 4, 1906.

Application filed January 27, 1906. Serial No. 298,297.

*To all whom it may concern:*

Be it known that I, EUGEN KLIMM, a subject of the German Emperor, residing at Stuttgart, in the Kingdom of Würtemberg, Empire of Germany, have invented certain new and useful Improvements in and Connected with the Furnace Arrangement of Steam-Engines, of which the following is a description, reference being had to the accompanying drawings, and to the figures of reference marked thereon.

The object of this invention is to provide a steam-engine in which the steam is generated directly adjacent to the engine, the steam-generating chamber forming a jacket for the cylinder of the engine.

A further object of the invention is to provide a steam-engine in which water in small quantities is vaporized as needed for the operation of the engine.

A still further object of the invention is to provide an engine and steam generator in which a finely-comminuted or fluid fuel is admixed with air under compression and consumed as required for the generation of steam.

A still further object of the invention is to provide an automatic fuel-burner in which compressed air is utilized for controlling the feeding of the fuel and also as a means for forcing the fuel into the combustion-chamber.

A still further object of the invention is to provide a device which embodies in small compass both a steam-engine and a steam-generator in which the generation of steam is started and stopped at will to control the operation of the engine.

Figure 1:
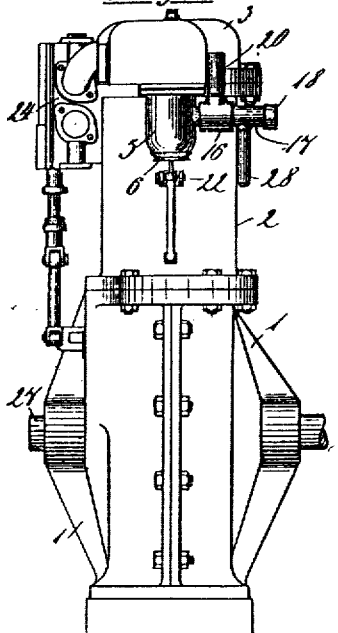
Figure 2:
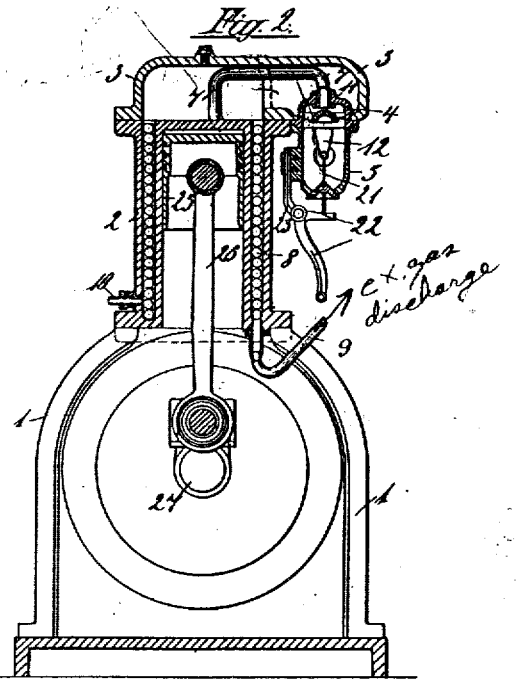
Figure 3:
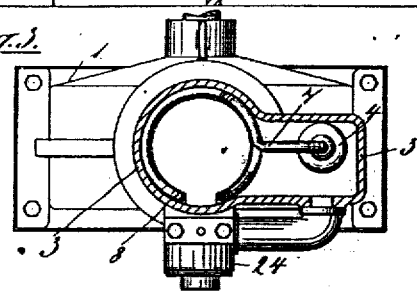
Figure 4:
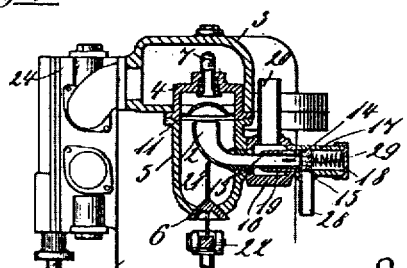
Figure 5:
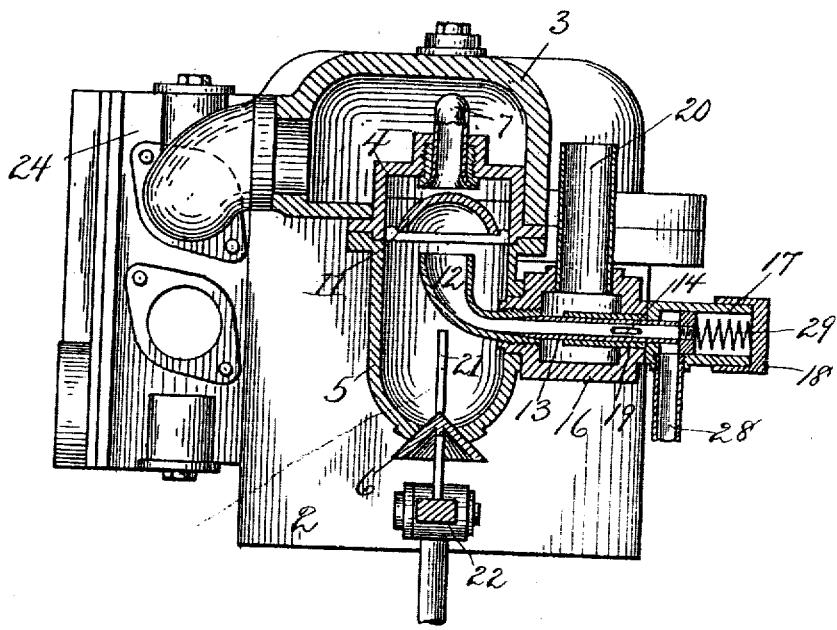

In the accompanying drawings, Figure 1 is a side elevation of an engine and steam-generator constructed and arranged in accordance with the invention. Fig. 2 is a vertical sectional view of the same in a plane at a right angle to Fig. 1. Fig. 3 is a sectional plan view through the cap or cover of the device. Fig. 4 is a vertical section through the combustion-chamber and fuel-feeder; and Fig. 5 is a view similar to Fig. 4, drawn to an enlarged scale.

Similar numerals of reference indicate corresponding parts throughout the specification and drawings.

The engine is mounted on a suitable base or support, including a crank-casing 2, that has suitable bearings for the support of the main shaft 27.

On top of the crank-case is secured a cylinder 8 and a cylinder-jacket 2, these being concentrically disposed and the space between them constituting a steam-generating chamber, the latter being open at the top and communicating with a steam-dome 3. The cylinder receives a trunk-piston 25, connected by a rod 26 to the crank-shaft, and steam from the dome is supplied to the cylinder through a suitable steam-chest 24, containing a valve for controlling the supply of steam. The valve and the steam-chest, their parts and connections may be of any type in common use, these being too well known to require specific description.

The combustion-chamber is preferably formed of two castings 4 and 5, of which the cap member 4 extends through an opening in the lower wall of the steam-dome, and from this cap leads a flue 7, which is coiled helically within the jacket 2, and terminates in a discharge pipe or flue 9, that leads from the bottom of the jacket. The products of combustion pass in a helical course through this flue and heat the water which enters at 10, the steam thus generated passing to the dome 3, and from thence to the steam-chest.

At one side of the combustion-chamber is a fuel-feeding chamber 16, to which pulverized or fluid fuel is fed through an inlet 20. From one side of the fuel-chamber leads a discharge-pipe 12, the end of which is turned up at a right angle and has a bell-shaped discharge-mouth immediately under a deflecting-hood 11.

At one side of the fuel-chamber 16 is a cylinder 17, having a head or cap 18, and in this cylinder is a piston 15, carrying an air-nozzle 13, the tapering discharge end of which is adapted to fit within the tapering end of the discharge-pipe 12, forming when closed a valve which will prevent the passage of fuel to the combustion-chamber. The nozzle is guided and supported by a tube 19, that is carried by one wall of the fuel-chamber.

Leading into the cylinder is a pipe 28, which is in communication with an air-pump or other source of supply of air under pressure, and when air is admitted it acts upon and forces the piston 15 rearward against the action of a coiled compression-spring 29, that is sealed in the rear end of the cylinder. This operation draws the nozzle 13 to the open position, and brings an opening 14 in the nozzle into communication with the front end of the cylinder, so that a portion of the compressed air will flow through the nozzle and act as an injector to carry the pulverized or fluid fuel from chamber 16 through the discharge or burner pipe 12, the jet of mingled air and fuel striking against the deflector 11 and being more intimately combined and burned.

At the bottom of the combustion-chamber is an opening closed by a conical valve 6, which may be opened by a manually-operable lever 22, pivoted on a bracket 23, that depends from the wall of the combustion-chamber. This valve carries a pin 21, on which an oil-saturated absorbent may be placed and ignited by a match or the like in starting the device into operation.

The valve 6 may be opened in order to remove carbonaceous or other deposits when necessary.

Having thus described my invention, what I claim as new, and desire to secure by Letters Patent, is—

1. In apparatus of the class described, the combination with a steam-engine, of a combustion-chamber, a flue leading therefrom, a steam-generating chamber from which steam is supplied to the engine, a deflector within the combustion-chamber, a fuel-chamber, a burner-pipe leading therefrom and terminating short of the deflector, an air-nozzle serving as a valve between the two chambers and provided with an opening near its rear end, a cylinder, a piston within the cylinder and connected to the nozzle, and means for admitting air under pressure to the cylinder to withdraw the nozzle to fuel-feeding position.

2. In apparatus of the class described, a combustion-chamber, a deflector arranged therein, a fuel-chamber, a burner-pipe leading therefrom and terminating short of the deflector, an air-nozzle forming a valve for closing the burner-pipe, said nozzle having an opening near its rear end, a cylinder, a piston within the cylinder and carrying the nozzle, means for admitting air under pressure to the cylinder to withdraw the nozzle to fuel-feeding position, and a spring tending to force said nozzle to closed position.

3. In apparatus of the class described, a combustion-chamber having a bottom opening, a valve normally closing said opening, and an absorbent carrier mounted on the valve, whereby preliminary heating of the chamber may be effected.

In testimony whereof I affix my signature in presence of two witnesses.

EUGEN KLIMM.

Witnesses:
A. B. DRAUTZ,
R. BRECHT